Figure 1:
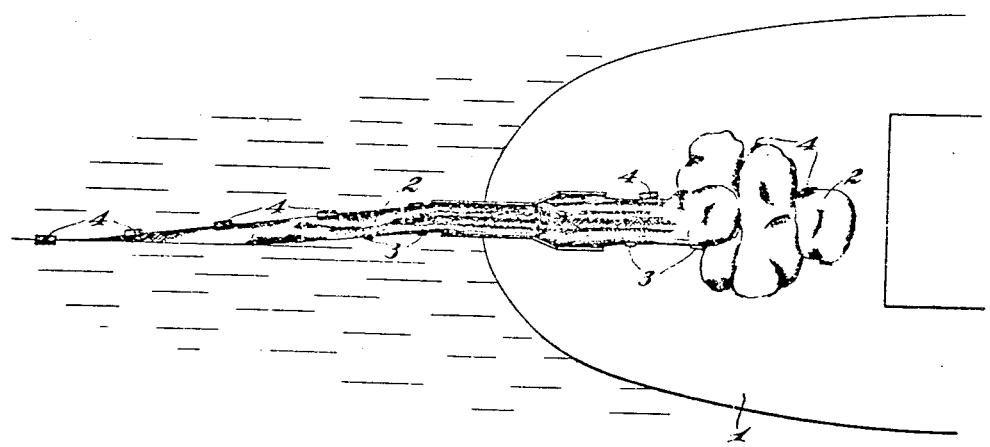

N. O. DAVIDSON.
BOAT ATTACHMENT FOR DELIVERING SEINES INTO THE WATER.
APPLICATION FILED MAR. 2, 1910.

963,211.

Patented July 5, 1910.
3 SHEETS—SHEET 1.

Witnesses:
W. H. Souba.
A. H. Opsahl.

Inventor,
Nils O. Davidson,
By his Attorneys
Williamson & Merchant

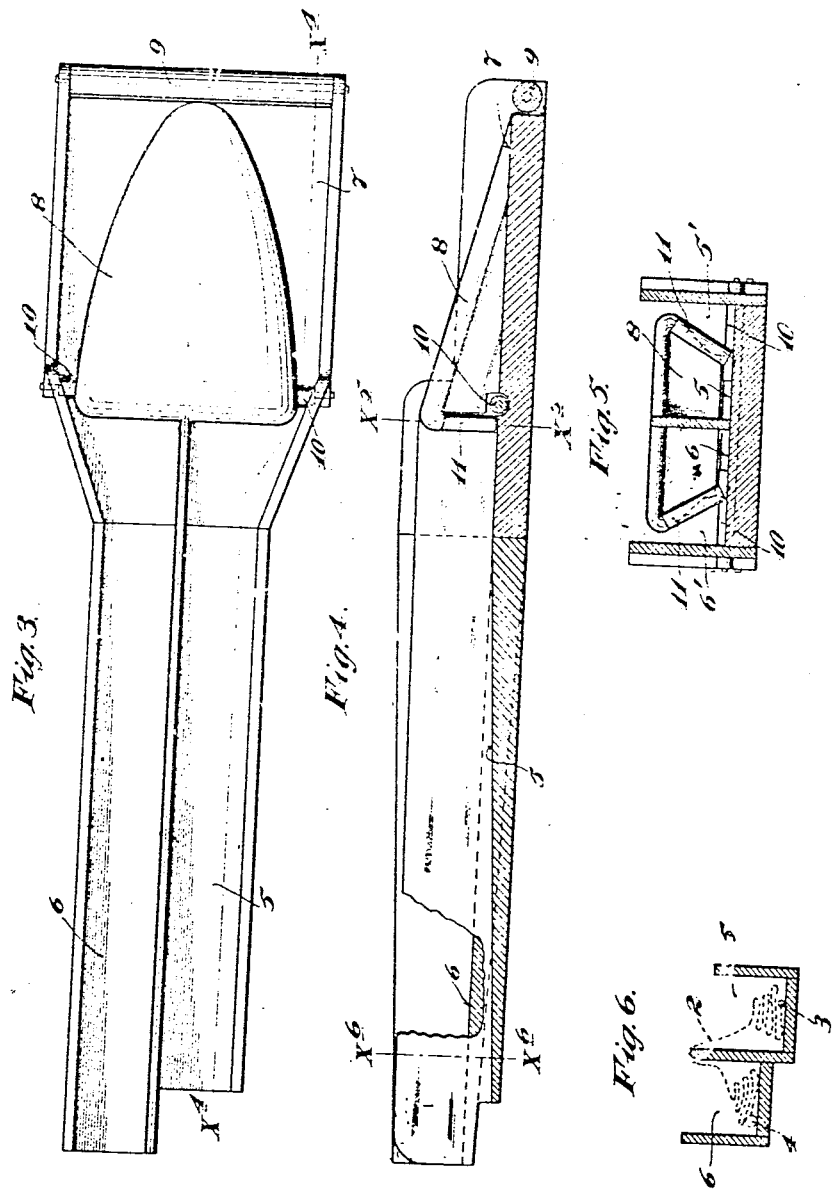

UNITED STATES PATENT OFFICE.

NILS O. DAVIDSON, OF MACOUN, SASKATCHEWAN, CANADA.

BOAT ATTACHMENT FOR DELIVERING SEINES INTO THE WATER.

963,211. Specification of Letters Patent. Patented July 5, 1910.

Application filed March 2, 1910. Serial No. 546,825.

*To all whom it may concern:*

Be it known that I, NILS O. DAVIDSON, residing at Macoun, in the Province of Saskatchewan, Dominion of Canada, have invented certain new and useful Improvements in Boat Attachments for Delivering Seines into the Water; and I do hereby declare the following to be a full, clear, and exact description of the invention, such as will enable others skilled in the art to which it appertains to make and use the same.

My invention has for its object to provide a simple and highly efficient device for use in delivering fishing seines from boats into the water.

To this end, the invention consists of the novel devices and combinations of devices hereinafter described and defined in the claims.

As is well known, in fishing at sea, or even in the large lakes, very long fishing seines are employed and these are delivered from a boat into the water and are thereafter pulled from the water back into the boat. The seines are delivered from the boat while the boat is in motion and it has hitherto been done entirely by hand and great difficulty has been experienced in preventing tangling or twisting of the seines in the act of delivering the same from the boat into the water. The problem of properly delivering the seine into the water is, first, to prevent tangling or twisting of the seine before it leaves the boat and, second, in delivering the seine into the water in such a manner that the weights at one edge thereof will be delivered into the water and submerged in advance of the floats that are attached to the other edge of the seine.

My invention provides a simple device for properly accomplishing this work.

The improved device comprises a pair of approximately parallel adjacent or closely positioned delivery troughs or channels that extend from the boat over the water. I have found that two principal features contribute to the proper delivery of the weighted and float-equipped edges of the seine into the water, to-wit: First, if the delivery trough for the weights or sinkers be terminated at a point below the delivery end of the trough for the floats, the weights or sinkers will be given a chance to drop into the water in advance of the transversely opposite floats and, hence, the seine will be delivered into the water properly set up or edgewise, and, hence, will assume a vertical or approximately vertical position. Furthermore, if the delivery end of the channel for the weights or sinkers be terminated ahead of the delivery end of the trough for the floats, substantially the same result will be attained. Both features should, however, be combined to insure the above noted proper delivery of the seine into the water.

In the accompanying drawings which illustrate the invention, like characters indicate like parts throughout the several views.

Figure 2:
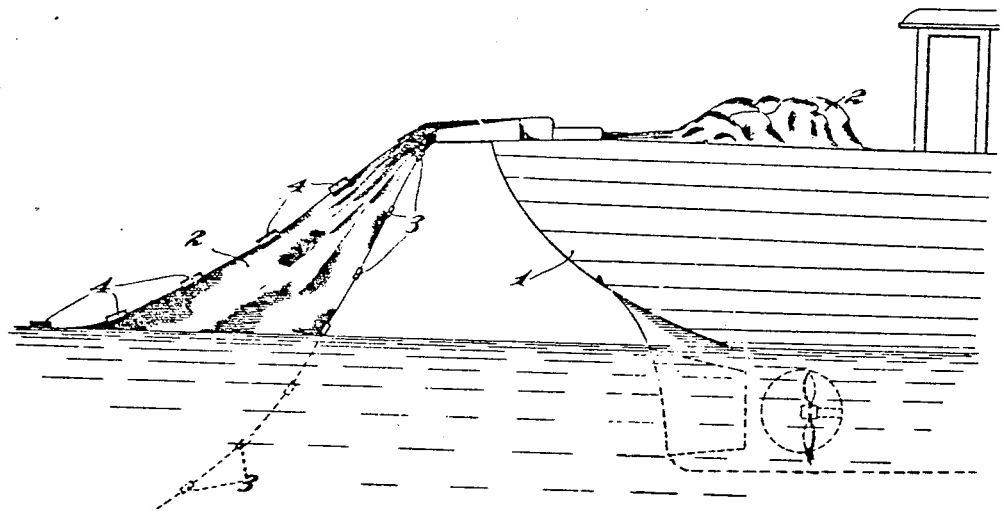
Figure 7:
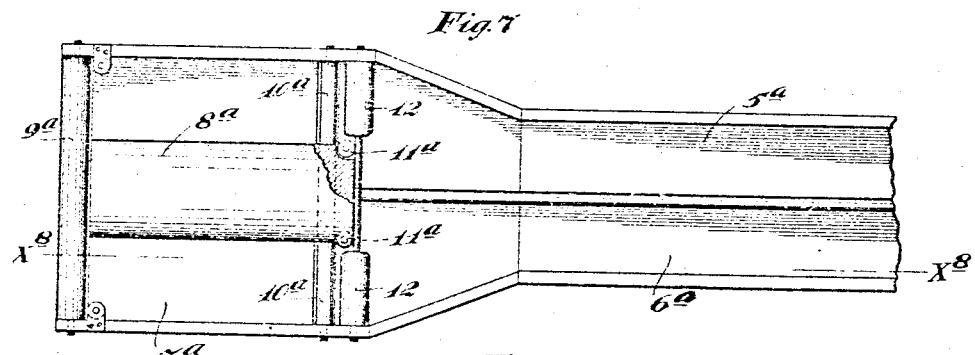
Figure 8:
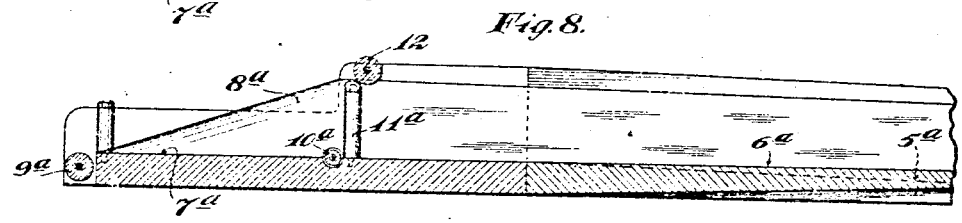
Figure 9:
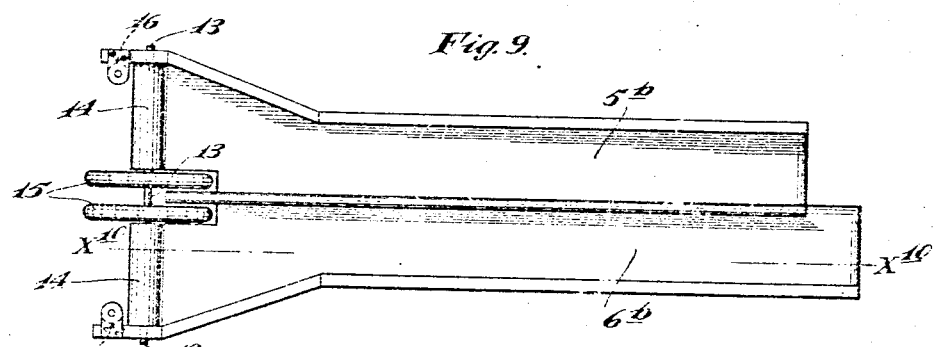
Figure 10:
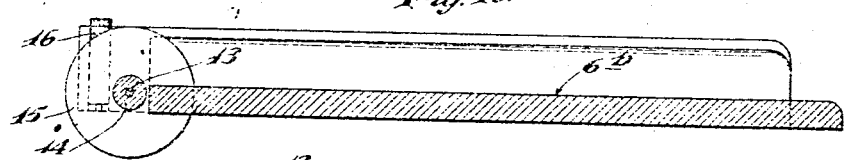
Figure 11:
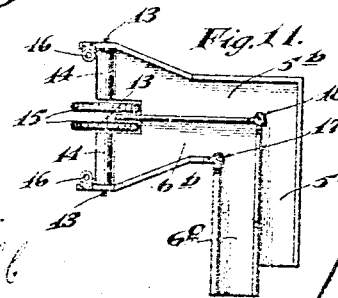

Referring to the drawings, Figures 1 and 2 are views respectively in plan and side elevation, showing the rear portion of a boat and illustrating a seine being delivered into the water from the boat by my improved device; Fig. 3 is a plan view showing, on a larger scale than Figs. 1 and 2, the seine delivery device removed from the boat; Fig. 4 is a section taken on the irregular line $x^4$ $x^4$ of Fig. 3, some parts being broken away; Fig. 5 is a transverse vertical section taken on the line $x^5$ $x^5$ of Fig. 4; Fig. 6 is a transverse vertical section taken on the line $x^6$ $x^6$ of Fig. 4; Fig. 7 is a plan view showing a slightly modified form of the seine delivery device; Fig. 8 is a vertical section taken on the line $x^8$ $x^8$ of Fig. 7; Fig. 9 is a plan view illustrating a still further modified form of the seine delivery device; Fig. 10 is a section taken on the line $x^{10}$ $x^{10}$ of Fig. 9; and Fig. 11 is a plan view showing a modification of the construction illustrated in Figs. 9 and 10.

The numeral 1 indicates a boat and the numeral 2 indicates a seine having, at one edge, weights or sinkers 3, and, at its other edge, floats 4.

Referring, first, to the construction illustrated in Figs. 1 to 5 inclusive, the numerals 5 and 6 indicate a pair of troughs or seine-delivery channels secured together, or side by side, with a single partition between them, and having flaring front ends that are connected to the rear end of a sort of a hopper box 7, which latter is formed by an extension of the bottom and outer sides of the two troughs. The trough 5 is intended for the delivery of the weighted edge 3 of the seine, while the trough 6 is intended for the delivery of the float-equipped edge 4 of the seine; and the delivery end of the said trough 5 terminates at a point below, and ahead of, the delivery end of the said trough 6, for the important purposes fully stated in the introductory part of this description. On the intermediate portion of the hopper box 7 is a wedge-shaped cam block 8, that rises and widens from the front central portion of the said box toward the rear thereof and, at its upper rear portion, terminates inward of the flaring side walls of the two troughs 5 and 6. Set into a seat formed at the extreme front end portion of the bottom of the hopper box 7, is a long roller 9, on which the entire seine is drawn on its way to the trough 5. The body of the seine will pass over the top of the cam block 8 and over the dividing partition between the two troughs, but the weights and floats will pass along the bottom of the said hopper box and will be delivered respectively through passages 5' and 6' into the troughs 5 and 6. To relieve the friction between the parts of the seine and the delivery device, as the weights and floats are passed through the passage ways 5' and 6', small bed rollers 10 are mounted in the bottom, and oblique rollers 11 are journaled on the sides of the cam block 8, as clearly shown in Figs. 3, 4 and 5. The seine must, of course, be properly started by hand into the hopper box, but this is all that is required as the subsequent delivering of the seine into the water will be accomplished in the manner already made clear.

In the modified construction illustrated in Figs. 7 and 8, the two delivery troughs 5ᵃ and 6ᵃ are, as before, connected to the hopper box 7ᵃ, having rollers 9ᵃ, 10ᵃ and 11ᵃ corresponding respectively to the before described rollers 9, 10 and 11; but the cam block 8ᵃ is not quite like the cam block 8, having, as shown, the same width throughout its entire length, and an upper guide roller 12 is mounted in the sides of the hopper box 7 for coöperation with the rollers 10ᵃ and 11ᵃ. The said roller 12, it will be noted, has end sections which, at their inner extremities, terminate sufficiently short of the upper extremities of the rollers 11ᵃ to permit the seine to pass off from the cam block 8 and onto and over the partition between the troughs 5ᵃ and 6ᵃ.

In the construction illustrated in Figs. 9 and 10, the trough 5ᵇ, for the delivery of the weights or sinkers, terminates in the same plane, but ahead of, the delivery end of the trough 6ᵇ which delivers the floats. In this construction also, the hopper box proper is dispensed with, but the receiving ends of the troughs 5ᵇ and 6ᵇ are made flaring, and in the plane of the flare thereof, a shaft or rod 13 is secured to the sides of the said troughs, and, on the shaft, rollers 14 and wheels 15 are mounted. The wheels 15 are positioned close to, and one on each side of, the partition between the two troughs. Small upper guide rollers 16 are journaled in suitable bearings on the projecting ends of the sides of the troughs, and these coöperate with the rollers 14 and the wheels 15 to deliver the seine, with its weights of the trough 5ᵇ and the floats of the trough 6ᵇ, and the body of the seine overlying the partition between the two troughs.

The construction shown in Fig. 11 is identical with that illustrated in Figs. 9 and 10 except that the troughs 5ᵇ and 6ᵇ are provided with extensions 5ᶜ and 6ᶜ respectively, that extend at right angles thereto and are provided with small upright rollers 17 and 18 at the corners around which the seine is caused to travel.

What I claim is:

1. A device for delivering seines from a boat into the water, comprising a pair of approximately parallel troughs, one for the floats and one for the weights, and having their delivery ends terminating at different points and arranged to deliver the weights into the water in advance of the floats, substantially as described.

2. The combination with a boat, of a device for delivering seines therefrom into the water, comprising a pair of approximately parallel troughs, one for the floats and one for the weights, the trough for the weights having its delivery end terminated at a point below the delivery end of the trough for the floats, substantially as described.

3. The combination with a boat, of a device for delivering seines therefrom into the water, comprising a pair of approximately parallel troughs, one for the floats and one for the weights, the trough for the weights having its delivery end terminated at a point below and in advance of the delivery end of the trough for the floats, substantially as described.

4. The combination with a boat, of a device for delivering seines therefrom into the water, comprising a pair of approximately parallel troughs terminating in a hopper box or enlarged receiving portion, the latter having a cam block adapted to raise the body of the seine and to deliver the floats into one of the troughs and the weights into the other trough, substantially as described.

5. The combination with a boat, of a device for delivering seines therefrom into the water, comprising a pair of approximately parallel troughs, provided with expanded receiving ends and guide rollers and coöperating receiving devices adapted to raise the body of the seine and to direct the weights into one of the troughs and the floats into the other trough, substantially as described.

In testimony whereof I affix my signature in presence of two witnesses.

NILS O. DAVIDSON.

Witnesses:
ALICE V. SOANSON,
HARRY D. KILGORE.